(12) United States Patent
Perdue et al.

(10) Patent No.: US 10,457,384 B2
(45) Date of Patent: Oct. 29, 2019

(54) EMISSION-CAPTURING APPARATUS AND METHOD FOR CAPTURING EMISSIONS FROM AN EJECTION PORT

(71) Applicant: Gulfstream Aerospace Corporation, Savannah, GA (US)

(72) Inventors: James Perdue, Savannah, GA (US); Jeffrey Slump, Savannah, GA (US); Bartley Beasley, Savannah, GA (US); Bret Bell, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/084,157

(22) Filed: Mar. 29, 2016

(65) Prior Publication Data
US 2017/0283093 A1 Oct. 5, 2017

(51) Int. Cl.
*B64C 25/22* (2006.01)
*B64F 5/60* (2017.01)
*B64C 25/30* (2006.01)

(52) U.S. Cl.
CPC ............... *B64C 25/22* (2013.01); *B64F 5/60* (2017.01); *B64C 25/30* (2013.01)

(58) Field of Classification Search
CPC ........... Y10T 137/86083; B25B 11/007; B25B 11/005; B64C 25/22
USPC .............. 244/129.1, 131, 136; 141/66, 231
See application file for complete search history.

(56) References Cited

U.S. PATENT DOCUMENTS

| 4,475,264 | A | * | 10/1984 | Schulz | A47L 11/30 15/321 |
| 5,038,815 | A | * | 8/1991 | Palmer | B01D 53/74 137/237 |
| 5,117,876 | A | * | 6/1992 | Kuntz | B64F 1/28 141/231 |
| 6,860,300 | B1 | * | 3/2005 | Kuntz | B64F 1/28 141/231 |
| 7,137,417 | B2 | * | 11/2006 | Kroll | B60S 5/046 141/38 |

* cited by examiner

*Primary Examiner* — Reinaldo Sanchez-Medina
*Assistant Examiner* — Nicole Gardner
(74) *Attorney, Agent, or Firm* — LKGlobal | Lorenz & Kopf, LLP (57) ABSTRACT

An emission-capturing apparatus includes a tank having an inlet and an outlet. The apparatus further includes a muffler fluidly coupled with the outlet to intercept fluid exiting the outlet, permit passage of gas through the muffler, and inhibit passage of liquid through the muffler. The apparatus further includes a hose having a tank end and a coupler end. The tank end is coupled to the inlet. The apparatus further includes a coupler coupled to the coupler end of the hose. The coupler has a drain hole. The coupler is configured to be coupled to a surface having an ejection port, to completely cover the ejection port when the coupler is coupled to the surface and to support the coupler end of the hose in a position to receive an emission when the drain hole is aligned with the ejection port.

20 Claims, 8 Drawing Sheets

EMISSION-CAPTURING APPARATUS AND METHOD FOR CAPTURING EMISSIONS FROM AN EJECTION PORT

TECHNICAL FIELD

The present invention generally relates to aircraft and more particularly relates to aircraft manufacturing, testing, and maintenance.

BACKGROUND

The nose landing gear of a fixed wing aircraft is commonly configured to retract into the fuselage of the aircraft during flight and to deploy prior to landings. The retraction and the deployment of the nose landing gear are hydraulically actuated. Sometimes, however, hydraulic systems malfunction. Modern aircraft include an emergency system that can deploy the nose landing gear in the event that the hydraulic system fails during flight. Such emergency systems use a canister of compressed gas (commonly nitrogen) to deploy the landing gear.

These emergency systems are tested when the aircraft is manufactured. The aircraft is hoisted above the ground and the compressed gas is discharged to confirm that the nose landing gear will deploy. This is referred to a "blow down" test. This blow down test is repeated a number of times during the manufacturing process to confirm the efficacy of the emergency system and is also performed from time to time after the aircraft has been placed in service.

When the compressed gas is released, hydraulic fluid in the hydraulic lines will be exposed to the compressed gas and will be emitted from the aircraft via an ejection port located in the side of the aircraft. The hydraulic fluid may be emitted as a mist, as a liquid, and/or some combination of the two. Accordingly, the technicians performing the test and any other persons in the vicinity of the aircraft during such testing may be exposed to the emitted hydraulic fluid. Hydraulic fluid is a caustic substance that can irritate a person's skin, eyes, and lungs. For this reason, contact with the hydraulic fluid emitted during blow down testing is undesirable.

Accordingly, it is desirable to provide an emission-capturing apparatus and a method for capturing emissions from an ejection port on the side of an aircraft. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of an emission-capturing apparatus for use with a vehicle having a surface having an ejection port, and various non-limiting embodiments of a method for capturing emissions from an ejection port disposed in a surface, are disclosed herein.

In a first non-limiting embodiment, the apparatus includes, but is not limited to, a tank having an inlet and an outlet. The apparatus further includes, but is not limited to, a muffler fluidly coupled with the outlet. The muffler is configured to intercept all fluid exiting the outlet, to permit passage of gas through the muffler, and to inhibit passage of liquid through the muffler. The apparatus further includes, but is not limited to, a hose having a tank end and a coupler end. The tank end is fluidly coupled to the inlet of the tank. The apparatus still further includes, but is not limited to, a coupler that is fluidly coupled to the coupler end of the hose. The coupler has a drain hole extending through the coupler. The coupler is configured to be fluidly coupled to the surface, to completely cover the ejection port, and to support the coupler end of the hose in a position to receive the emission from the ejection port when the coupler is coupled to the surface and when the drain hole is aligned with the ejection port.

In another non-limiting embodiment, the method includes, but is not limited to, the steps of positioning an emission-capturing apparatus proximate the ejection port. The emission-capturing apparatus includes, but is not limited to, a tank having an inlet and an outlet. The emission-capturing apparatus further includes, but is not limited to, a muffler that is fluidly coupled with the outlet. The muffler is configured to intercept all fluid exiting the outlet, to permit passage of gas through the muffler, and to inhibit passage of liquid through the muffler. The emission-capturing apparatus further includes, but is not limited to, a hose having a tank end and a coupler end. The tank end is fluidly coupled to the inlet of the tank. The emission-capturing apparatus still further includes, but is not limited to, a coupler fluidly coupled to the coupler end of the hose. The coupler has a drain hole extending through the coupler. The coupler is configured to be fluidly coupled to the surface, to completely cover the ejection port, and to support the coupler end of the hose in a position to receive the emission from the ejection port when the coupler is coupled to the surface and when the drain hole is aligned with the ejection port. The method further includes, but is not limited to the step of coupling the coupler to the surface such that the coupler completely covers the ejection port and such that the drain hole is aligned with the ejection port. The method still further includes, but is not limited to capturing the emission emanating from the ejection port with the emission-capturing apparatus.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An apparatus for capturing the emission from an ejection port disposed in a surface on the side of a vehicle is taught herein. In an exemplary embodiment, the emission-capturing apparatus includes a tank that includes an inlet and an outlet. In the exemplary embodiment, a muffler is attached to the outlet of the tank in a fluid tight manner. Throughout this document, the terms "water tight", "fluid tight", and "fluidly coupled" are used interchangeably and any suitable method for ensuring a water tight connection may be employed without departing from the teachings of the present disclosure.

The muffler is configured to allow gaseous material to pass through the muffler but to inhibit the passage of liquids through the muffler. In the exemplary embodiment, a hose is attached to the inlet of the tank in a fluid tight manner. At an opposite end of the hose, the hose is attached to a coupler in a fluid tight manner. The second end of the hose is attached to the coupler at a drain hole that extends through the muffler. In this manner, the coupler does not close off the hose, but rather, the drain hole through the coupler acts as an extension of the hose and serves to guide fluids into the second end of the hose.

In the exemplary embodiment, the coupler is configured to be positioned on the surface of the vehicle over the ejection port and to be coupled to the surface in a fluid tight manner. The coupler is to be coupled to the side of the vehicle such that the opening in the coupler that leads to the second end of the hose is aligned with, and positioned over the ejection port so as to receive emissions emitted from the ejection port. In the exemplary embodiment, the opening in the coupler has a larger diameter than the diameter of the ejection port. Accordingly, in the exemplary embodiment, the coupler is configured to catch all emissions emitted from the ejection port.

The exemplary embodiment further includes a vacuum generator and a vacuum line. One end of the vacuum line is fluidly coupled with the vacuum generator and the other end of the vacuum line is fluidly coupled with the coupler. The coupler has a vacuum hole extending through the coupler. The second end of the vacuum line is fluidly coupled with the coupler at the vacuum hole such that the vacuum can be applied at the distant side of the coupler. When the vacuum generator is actuated while the coupler is positioned adjacent the side of the vehicle over the ejection port, the coupler will be coupled to the side of the vehicle via the vacuum and will remain coupled in this manner until the vacuum is deactivated.

With the coupler coupled to the side of the vehicle over the ejection port, the blow down test may be conducted. The fluid emitted from the ejection port (which may be gaseous, liquid, or a combination thereof) will pass through the opening of the coupler and continue into the hose where it will be guided into the tank. As the fluid enters into the tank, the pressure inside the tank will become elevated. The fluid inside the tank (i.e., a mixture of air, nitrogen gas, atomized hydraulic fluid, and liquid hydraulic fluid) will attempt to exit the tank through the outlet. The outlet is obstructed by the muffler. The muffler will allow the gases to exit, but will obstruct the liquids from exiting. The liquids will then drain back into the tank where they will remain safely stored until drained and disposed of. Towards that end, a conduit and a valve are attached to the tank to permit the tank to be drained.

A greater understanding of the emission-capturing apparatus described above and of the method for capturing the emission from an ejection port may be obtained through a review of the illustrations accompanying this application together with a review of the detailed description that follows.

Figure 1:
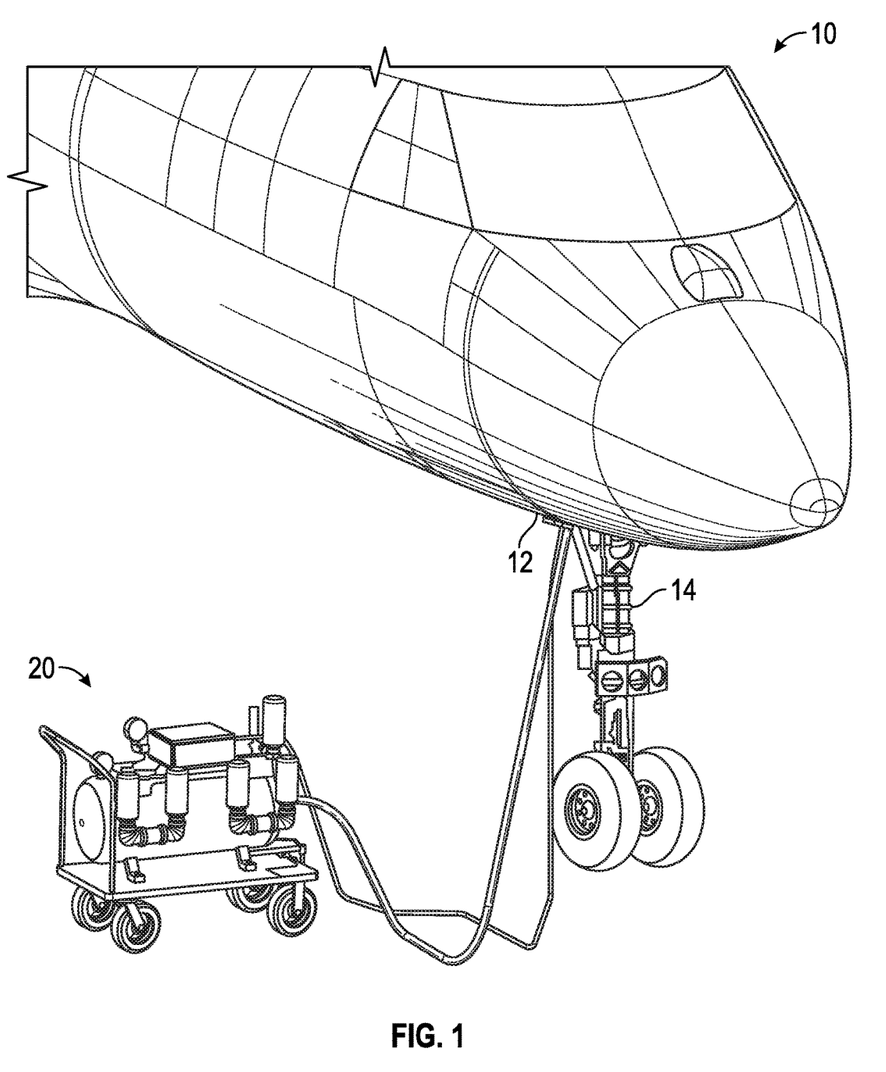
FIG. 1 is an environmental view illustrating an aircraft and a non-limiting embodiment of an emission-capturing apparatus.

FIG. 1 is an environmental view illustrating an aircraft 10 having a side 12 and a nose landing gear 14. Aircraft 10 is suspended above a floor/ground surface by a hoist (not shown) and nose landing gear 14 is disposed in a deployed position. Also illustrated in FIG. 1 is a non-limiting embodiment of an emission-capturing apparatus 20. Emission-capturing apparatus 20 is illustrated while coupled with side 12 and arranged to capture an emission emitted from an ejection port disposed in side 12. Although the figures of the present disclosure and the discussion contained herein center around capturing emissions from an ejection port disposed in the side of an aircraft during a blow down procedure, it should be understand that the emission-capturing apparatus disclosed herein is not limited to this use or this context. Rather, the emission-capturing apparatus disclosed herein may be used to collect any emission emitted from any ejection port associated with any vehicle or any structure having an ejection port or an exhaust port.

Figure 2:
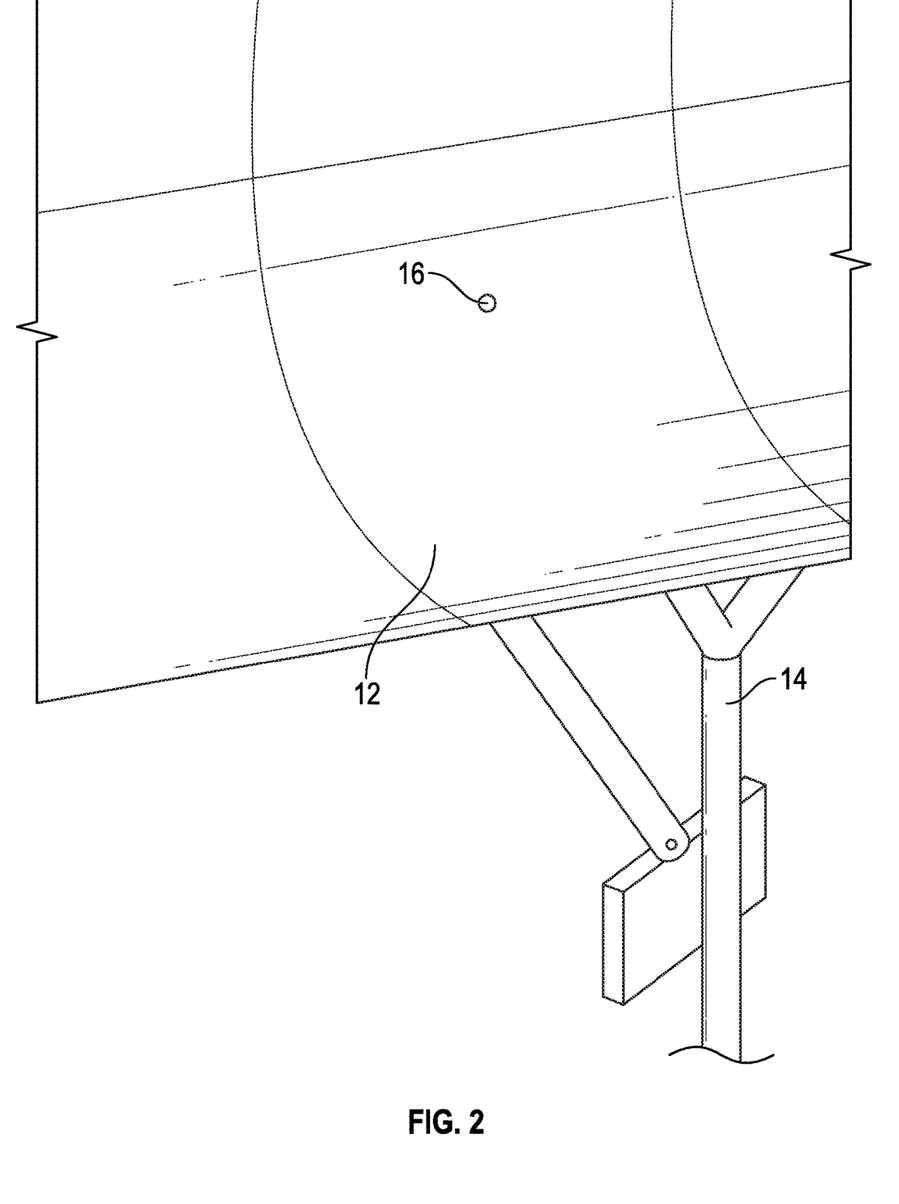
FIG. 2 is a perspective view illustrating an enlarged portion of the aircraft of FIG. 1.

FIG. 2 is a perspective view illustrating an expanded portion of side 12. Emission-capturing apparatus 20 of FIG. 1 has been omitted from this view to allow an unobstructed view of ejection port 16. As discussed above, hydraulic fluid resides in the hydraulic lines of aircraft 10. Those hydraulic lines are fluidly coupled with ejection port 16. When aircraft 10 undergoes blow down testing, hydraulic fluid residing in those hydraulic lines will be emitted from ejection port 16. Compressed gas (e.g., nitrogen) may be used to deploy nose landing gear 14 during the blow down testing procedure and/or during actual in-flight emergency actuation of the nose landing gear. Depending upon the pressure of the compressed gas, the hydraulic fluid that is emitted from ejection port 16 may be either partially or completely atomized and thus the emission may be either liquid, gas, or a combination of the two.

Figure 3:
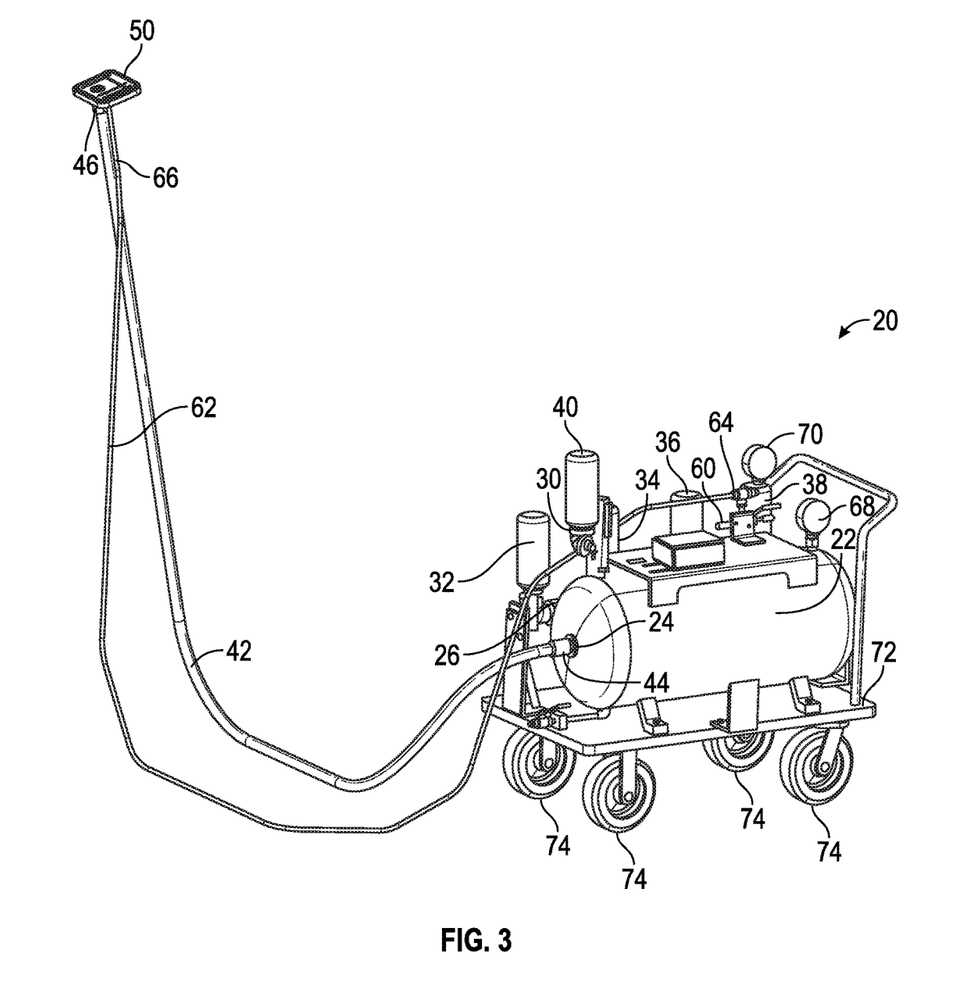
FIG. 3 is a perspective view of the emission-capturing apparatus of FIG. 1.
Figure 4:
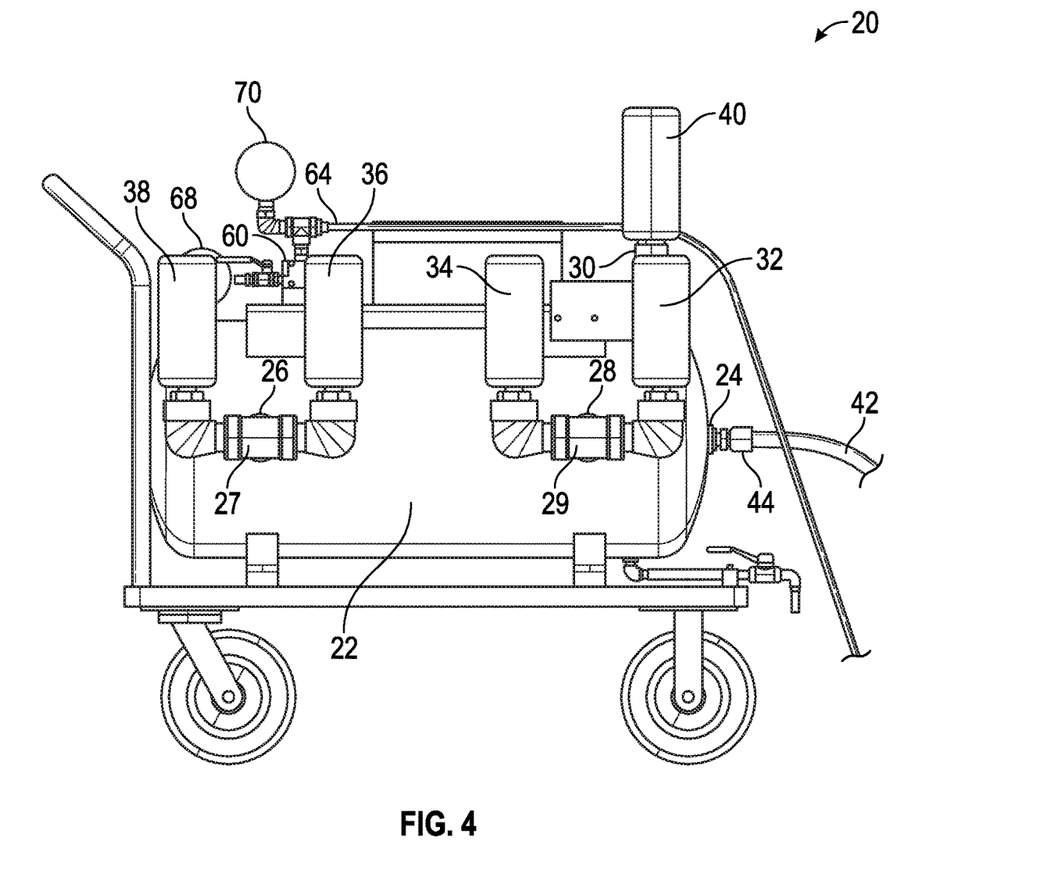
FIG. 4 is a fragmentary front view of a portion of the emission-capturing apparatus of FIG. 1.

FIG. 3 is a perspective view and FIG. 4 is a fragmentary front view illustrating emission-capturing device 20. Emission-capturing apparatus 20 includes a tank 22. Tank 22 may be any suitable hollow or partially hollow fluid-tight collection tank or other container suitable for receiving and for storing hydraulic fluid. By providing tank 22 with a substantially wider diameter than ejection port 16 and a substantially wider diameter than the hose used to deliver the emitted hydraulic fluid to tank 22, tank 22 is able to step down the pressure of the pressurized fluid emitted by ejection port 16.

Tank 22 includes an inlet 24, an outlet 26 (best seen in FIG. 4), an outlet 28 (best seen in FIG. 4), and an outlet 30. The pressure of the pressurized fluid emitted from ejection port 16 is diminished upon entry into tank 22 but, is nevertheless, greater than ambient pressure. Accordingly, the pressurized fluid which enters tank 22 via inlet 24 will immediately exit tank 22 via outlets 26, 28, and 30 unless it is obstructed.

To obstruct the pressurized, atomized hydraulic fluid from exiting via outlets 26, 28, and 30, those outlets are fitted with mufflers. Outlet 26 is fitted with two mufflers, muffler 36 and muffler 38. Outlet 28 is also fluidly coupled with two mufflers, muffler 32 and muffler 34. To accommodate two mufflers from a single outlet, a splitter is fluidly coupled directly to the outlet and then each muffler is fluidly coupled to opposite ends of the splitter. For example, a splitter 27 is fluidly coupled with outlet 26 and a splitter 29 is fluidly coupled with outlet 28. Finally, outlet 30 is fluidly coupled with a single muffler, muffler 40. In other embodiments different configurations may be employed. For example, in some embodiments, a single muffler or multiple mufflers fewer than five may be employed without departing from the teachings of the present disclosure. In still other embodiments, greater than five mufflers may be employed without departing from the teachings of the present disclosure.

Mufflers 32, 34, 36, 38, and 40 may be any suitable muffler effective to permit gas to pass through the muffler while contemporaneously obstructing liquid from passing through the muffler. Mufflers 32, 34, 36, 38, and 40 may include baffles, filters, and other internal structures that are configured to inhibit and obstruct liquid from passing through the muffler, but which are porous to gasses. Thus, the mufflers permit the pressurized gas in tank 22 to exit while retaining the hydraulic fluid within tank 22. In this manner, any overpressure in tank 22 arising from the inflow of the pressurized gas and hydraulic fluid will be dissipated.

Emission-capturing apparatus 20 further includes a hose 42 and a coupler 50. Hose 42 is configured to deliver the hydraulic fluid emitted from ejection port 16 (see FIG. 2) to tank 22. Hose 42 has an end 44 and an end 46. End 44 is fluidly coupled with inlet 24, while end 46 is coupled with coupler 50.

Coupler 50 includes a drain hole. When coupler 50 is positioned over ejection port 16 with the drain hole aligned with ejection port 16, and when coupler 50 is fluidly coupled to side 12, then coupler 50 supports end 46 of hose 42 in a position to receive all of the hydraulic fluid emitted by ejection port 16. This will be discussed in greater detail below.

Emission-capturing apparatus 20 further includes a vacuum generator 60 and a vacuum line 62. In the illustrated embodiment, vacuum generator 60 is mounted to tank 22. It should be understood that in other embodiments, vacuum generator need not be mounted to tank 22. Vacuum generator 60 may comprise any devise effective to generate a vacuum on demand. In the illustrated embodiment, vacuum generator 60 is configured to operate on compressed air (i.e., to operate pneumatically). In other embodiments, any type of vacuum generator may be employed without departing from the teachings of the present disclosure.

Vacuum line 62 is fluidly coupled with vacuum generator 60 at an end 64 (best seen in FIG. 5) and is fluidly coupled at an end 66 (best seen in FIGS. 6-8) with a vacuum hole in coupler 50. The vacuum generated by vacuum generator 60 is transmitted via vacuum line 62 to the vacuum hole of coupler 50 and coupler 50 utilizes the vacuum to fluidly couple to side 12 (see FIG. 8) and to remain coupled with side 12 as long as the vacuum is present.

Emission-capturing apparatus 20 further includes a pressure gage 68 and a vacuum gage 70. Pressure gage 68 is fluidly coupled with tank 22 (best seen in FIG. 5) and is configured to detect and display the pressure of the gases within tank 22. Vacuum gage 70 is fluidly coupled to vacuum line 62 and to vacuum generator 60 (best seen in FIG. 5) and is configured to measure the pressure of gas in vacuum line 62. These gages enable a user to monitor the respective pressures in tank 22 and vacuum line 62.

Emission-capturing apparatus 20 further includes a cart 72. Cart 72 includes wheels 74 which permit a user to position emission-capturing apparatus 20 in a position proximate to aircraft 10 and to reposition emission-capturing apparatus 20 next to another aircraft or elsewhere after completion of the blow down test. In other embodiments, emission-capturing apparatus 20 may omit cart 72 or, alternatively, may employ other means of mobility.

Figure 5:
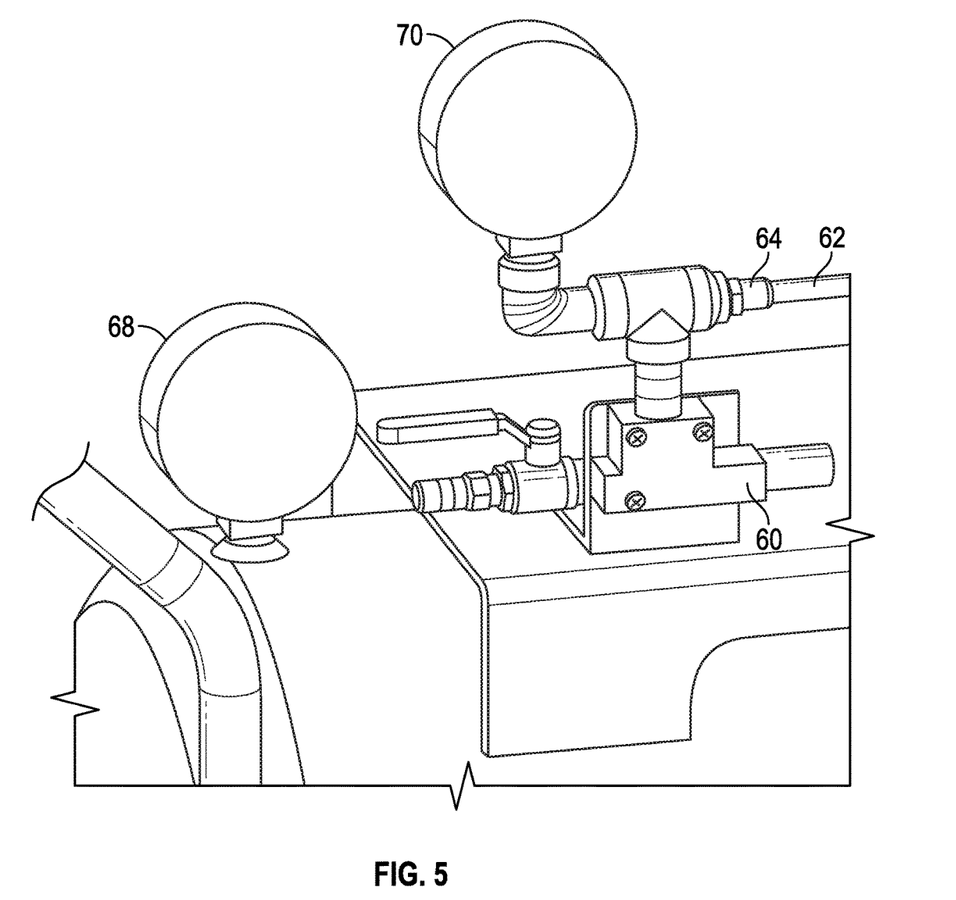
FIG. 5 is a fragmentary perspective view of another portion of the emission-capturing apparatus of FIG. 1.

FIG. 5 is an expanded view illustrating a portion of emission-capturing apparatus 20. In this view, the fluid coupling between pressure gage 68 and tank 22 and the fluid coupling between vacuum gage 70 and vacuum generator 60 and vacuum line 62 can be viewed.

Figure 6:
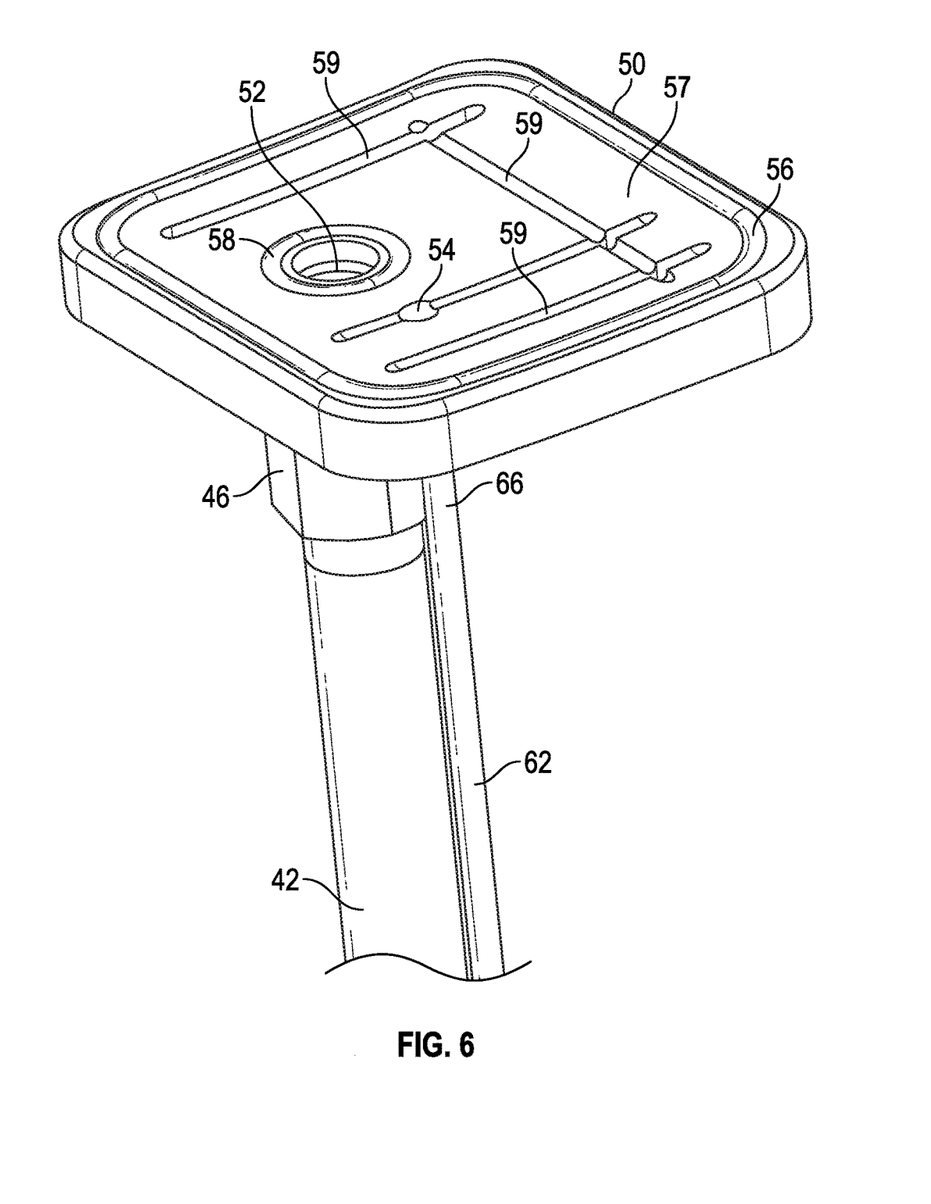
FIG. 6 is a fragmentary perspective view of another portion of the emission-capturing apparatus of FIG. 1.

FIG. 6 is a fragmented perspective view presenting an enlarged view of coupler 50 and a portion of vacuum line 62 including end 66 and a portion of hose 42 including end 46. The side of coupler 50 presented in FIG. 6 is the side that will be positioned adjacent to side 12 (see FIG. 1). In this view, drain hole 52 and vacuum hole 54 can be viewed. Drain hole 52 and vacuum hole 54 extend through coupler 50 and serve to facilitate the passage of hydraulic fluid emitted from ejection port 16 (see FIG. 1) and to facilitate the passage of air when the vacuum is applied, respectively.

A seal 56 is disposed around a periphery of coupler 50 and a seal 58 is disposed around a periphery of drain hole 52. Seal 56 and seal 58 provide an air-tight boundary to contain the vacuum between coupler 50 and side 12 (see FIG. 2) when the vacuum is actuated by vacuum generator 60 (see FIG. 5) and transmitted through vacuum line 62 (see FIG. 3) and through vacuum hole 54. This contained region of vacuum permits coupler 50 to remain coupled with side 12 (see FIG. 2) via suction. By positioning seal 56 around the periphery of coupler 50, the vacuum can be applied across a relatively wide surface area and thereby provide a robust connection. By positioning seal 58 around the periphery of drain hole 52, a barrier is formed between the vacuum and the drain hole. This ensures that the emission leaving ejection port 16 (see FIG. 2) is not exposed to the vacuum and redirected into vacuum hole 54 and down into vacuum line 62. A channel 59 is defined in, and extends along a surface 57 of coupler 50. Channel 59 fluidly communicates with vacuum hole 54 and provides a route for air trapped between surface 57 and side 12 (see FIG. 2) to escape through vacuum hole 54.

Figure 7:
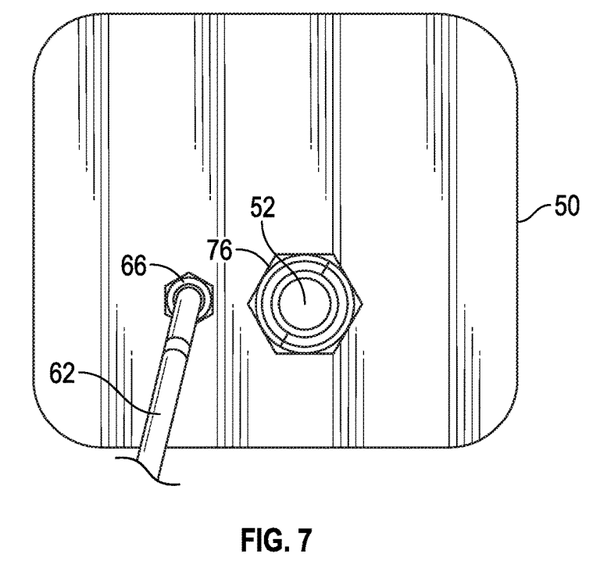
FIG. 7 is a fragmentary plan view illustrating the portion of FIG. 6, depicted from a different viewing angle.

FIG. 7 illustrates an underside of coupler 50, with hose 42 removed. In the illustrated embodiment, vacuum line 62 is fluidly coupled with vacuum hole 54 (see FIG. 6) via a threaded engagement. A threaded receiver 76 is disposed on the underside of coupler 50 and is configured for fluid coupling with end 46 (see FIG. 6) of hose 42 (see FIG. 6) via a threaded engagement. While threaded engagements are illustrated in FIG. 7 and elsewhere in this disclosure, it should be understood that any type of engagement that provides a fluid-tight connection between fluid-carrying components may alternately be employed.

With hose 42 (see FIG. 6) removed, a technician is permitted to look through drain hole 52. This facilitates the coupling of coupler 50 with side 12 (see FIG. 2) because it allows a technician to peer through drain hole 52 and visually locate ejection port 16 (see FIG. 2). While maintaining visual contact with ejection port 16 (see FIG. 2), the technician places coupler 50 up against side 12 (see FIG. 2) and positions coupler 50 so that drain hole 52 is aligned with ejection port 16 (see FIG. 2). With coupler 50 disposed in this manner, vacuum generator 60 (see FIG. 5) is actuated, air is evacuated from the space between coupler 50 and side 12 (see FIG. 2) and coupler 50 will be held in place by suction. Once this has occurred, hose 42 (see FIG. 6) may be recoupled to coupler 50.

In the illustrated embodiment, drain hole 52 has a larger diameter than ejection port 16 (see FIG. 2). This ensures that all emissions emitted from ejection port 16 (see FIG. 2) will enter drain hole 52. In other embodiments, drain hole 52 may have a substantially equal diameter or a smaller diameter than ejection port 16 (see FIG. 2) without departing from the teachings of the present disclosure.

Figure 8:
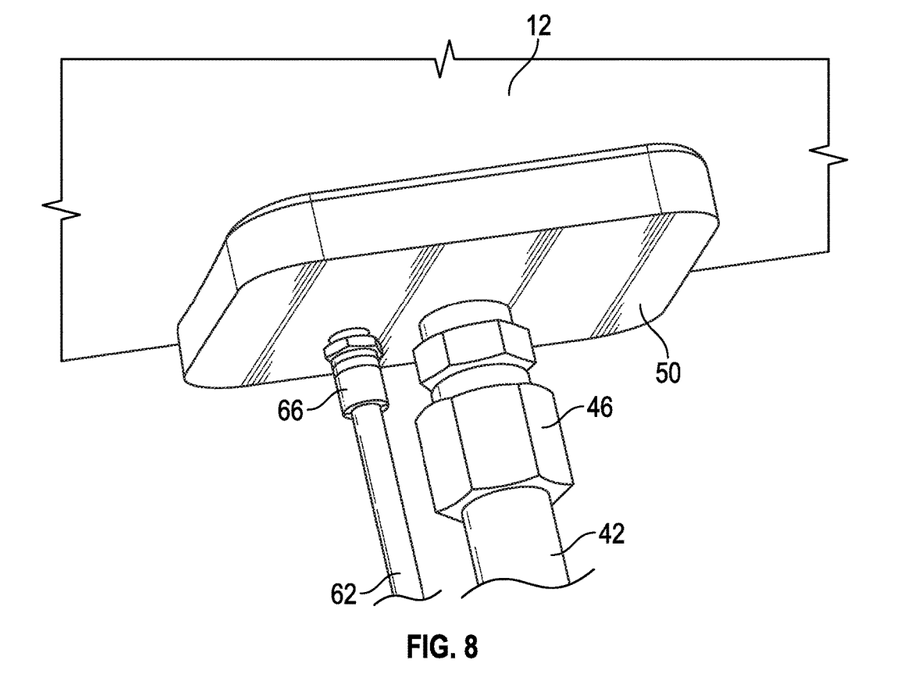
FIG. 8 is a fragmentary perspective view illustrating a portion of the emission-capturing apparatus fluidly coupled to the aircraft of FIG. 1.

FIG. 8 is a perspective view illustrating coupler 50 coupled with side 12. Vacuum generator 60 (see FIG. 5) has been actuated and this permits coupler 50 to remain attached to side 12 without any assistance from a technician. Hose 42 has been recoupled with coupler 50 and is ready to receive emissions from ejection port 16 (see FIG. 2).

Figure 9:
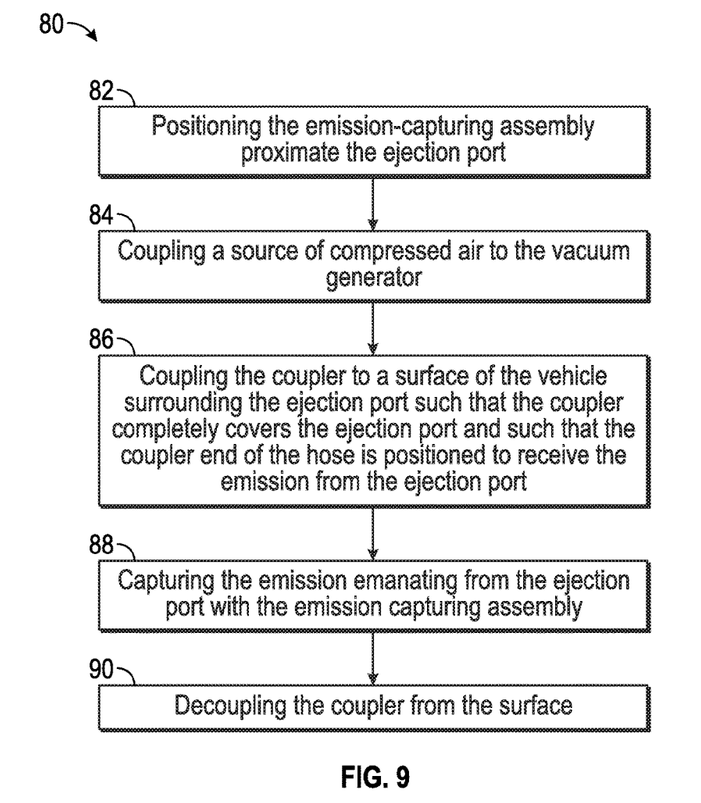
FIG. 9 is a flow diagram illustrating a non-limiting embodiment of a method for capturing an emission from an ejection port of a vehicle.

FIG. 9 is a flow diagram illustrating a non-limiting embodiment of a method 80 for capturing an emission emanating from an ejection port disposed in a surface of a vehicle. At step 82, an emission-capturing apparatus is positioned proximate to the ejection port on the side of the vehicle. With continuing reference to FIGS. 1-8, in some embodiments, the emission-capturing apparatus may be emission-capturing apparatus 20, described above. Therefore, for the sake of brevity, a detailed description of the components of the emission-capturing apparatus will be omitted.

At step 84, the vacuum generator of the emission-capturing apparatus is fluidly coupled with a source of compressed air (commonly referred to as "shop air"). This will enable the vacuum generator to apply a vacuum when actuated in examples where the vacuum generator is configured to operate pneumatically. In other embodiments, rather than fluidly coupling the vacuum generator to a source of compressed air, any other necessary coupling may be applied that will permit the vacuum generator to apply a vacuum.

At step 86, the coupler of the emission-capturing apparatus is coupled to the surface of the vehicle around the ejection port and positioned to completely cover the ejection port and oriented such that a drain hole in the coupler and a hose fluidly coupled with the drain hole are positioned to receive the emissions from the ejection port. This step may entail temporarily removing the hose from the coupler and visually aligning the drain hole with the ejection port. This step may also entail actuating the vacuum generator to cause the coupler to couple with the side of the vehicle by suction.

At step 88, the emissions from the ejection port are captured by the emission-capturing apparatus. This may occur during a blow down test or during any other activity that causes an emission to be emitted from the ejection port.

At step 90, the coupler is decoupled from the side of the vehicle. This step may entail observing a pressure gage associated with the tank of the emission-capturing apparatus and waiting until the internal pressure of the tank has returned to ambient before decoupling the coupler from the side of the vehicle.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. An emission-capturing apparatus for use in conjunction with a vehicle having a surface, the surface including an ejection port, the emission-capturing apparatus comprising:
   a tank having an inlet and an outlet, the outlet being disposed above a bottom of the tank, an internal ambient pressure of the tank being at least equal to an external ambient pressure at all times;
   a muffler fluidly coupled with the outlet, the muffler configured to intercept all fluid exiting the outlet, to permit passage of gas through the muffler, and to inhibit passage of liquid through the muffler;
   a hose having a tank end and a coupler end, the tank end fluidly coupled to the inlet of the tank; and
   a coupler fluidly coupled to the coupler end of the hose, the coupler having a drain hole extending through the coupler, the coupler configured to be fluidly coupled to the surface, to completely cover the ejection port, and to support the coupler end of the hose in a position to receive an emission from the ejection port when the coupler is coupled to the surface and when the drain hole is aligned with the ejection port.

2. The emission-capturing apparatus of claim 1, wherein the coupler is configured to be selectively decoupled from the coupler end of the hose.

3. The emission-capturing apparatus of claim 2, wherein the coupler is configured for threaded engagement with the coupler end of the hose.

4. The emission-capturing apparatus of claim 1, further comprising:
   a vacuum generator; and
   a vacuum line having a first end and a second end, the vacuum line fluidly coupled with the vacuum generator at the first end and fluidly coupled with the coupler at the second end.

5. The emission-capturing apparatus of claim 4, wherein the vacuum generator is configured to operate pneumatically.

6. The emission-capturing apparatus of claim 4, wherein the vacuum generator is mounted to the tank.

7. The emission-capturing apparatus of claim 4, further comprising a vacuum gage in fluid communication with one of the vacuum generator and the vacuum line.

8. The emission-capturing apparatus of claim 4, wherein the coupler is configured to apply a vacuum to the surface when the vacuum generator is actuated and when the coupler is positioned in contact with the surface, whereby the vacuum couples the coupler to the surface.

9. The emission-capturing apparatus of claim 8, wherein a channel is defined in a side of the coupler proximate the surface and wherein the channel is in fluid communication with the vacuum line.

10. The emission-capturing apparatus of claim 8, wherein the coupler includes a first seal and a second seal, the first seal disposed proximate a periphery of the coupler and the second seal disposed around the drain hole in the coupler, the drain hole being in fluid communication with the coupler end of the hose, whereby the vacuum is contained between the coupler and the surface and whereby the drain hole and the ejection port are fluidly insulated from the vacuum.

11. The emission-capturing apparatus of claim 1, wherein the tank further includes a drain.

12. The emission-capturing apparatus of claim 11, wherein the drain comprises a conduit and a valve.

13. The emission-capturing apparatus of claim 1, further comprising a second muffler, wherein the tank has a second outlet and wherein the second muffler is fluidly coupled with the second outlet, the second muffler configured to intercept all fluid exiting the second outlet, to permit the passage of gas through the muffler, and to inhibit the passage of liquid through the muffler.

14. The emission-capturing apparatus of claim 1, further comprising a pressure gage fluidly coupled with the tank and configured to detect and display a pressure within the tank.

15. The emission-capturing apparatus of claim 1, further comprising a cart having a plurality of wheels, wherein the tank is mounted to the cart.

16. A method for capturing an emission emanating from an ejection port disposed in a surface of a vehicle, the method comprising the steps of:

positioning an emission-capturing apparatus proximate the ejection port, the emission-capturing apparatus including, but not limited to, a tank having an inlet and an outlet, the outlet being disposed above a bottom of the tank, an internal ambient pressure of the tank being at least equal to an external ambient pressure at all times, a muffler fluidly coupled with the outlet, the muffler configured to intercept all fluid exiting the outlet, to permit passage of gas through the muffler, and to inhibit passage of liquid through the muffler, a hose having a tank end and a coupler end, the tank end fluidly coupled to the inlet of the tank, and a coupler fluidly coupled to the coupler end of the hose, the coupler having a drain hole extending through the coupler, the coupler configured to be fluidly coupled to the surface, to completely cover the ejection port, and to support the coupler end of the hose in a position to receive the emission from the ejection port when the coupler is coupled to the surface and when the drain hole is aligned with the ejection port;

coupling the coupler to the surface such that the coupler completely covers the ejection port and such that the drain hole is aligned with the ejection port; and capturing the emission emanating from the ejection port with the emission-capturing apparatus.

17. The method of claim 16, wherein the emission-capturing apparatus further includes a vacuum generator and a vacuum line having a first end and a second end, the vacuum line fluidly coupled with the vacuum generator at the first end and fluidly coupled with the coupler at the second end, and wherein the step of coupling the coupler to the surface comprises actuating the vacuum generator and coupling the coupler to the surface with a vacuum.

18. The method of claim 17, wherein the vacuum generator is configured to be operated pneumatically, the method further comprising the steps of fluidly coupling a compressed air source to the vacuum generator and actuating the compressed air source.

19. The method of claim 16, further comprising the step of decoupling the coupler from the surface when the emission has been captured by the emission-capturing apparatus.

20. The method of claim 19, wherein the emission-capturing apparatus further includes a pressure gage coupled with the tank, and wherein the coupler is decoupled from the surface when the pressure gage registers a desired pressure level within the tank.

\* \* \* \* \*